United States Patent
Digate et al.

(10) Patent No.: US 8,370,432 B2
(45) Date of Patent: Feb. 5, 2013

(54) INITIATING AN ON-LINE MEETING VIA A WEB PAGE LINK

(75) Inventors: Charles J. Digate, Winchester, MA (US); Christopher F. Herot, Newton Highlands, MA (US); Tonytip Ketudat, Lexington, MA (US); Alexis M. Kopikis, Brighton, MA (US); Carol A. Harris, Concord, MA (US); Mark J. Waks, Burlington, MA (US); Rajeev Tipnis, Needham, MA (US)

(73) Assignee: Devereux Research AB LLC, Wilmington, DE (US)

( * ) Notice: Subject to any disclaimer, the term of this patent is extended or adjusted under 35 U.S.C. 154(b) by 0 days.

(21) Appl. No.: 11/293,035

(22) Filed: Dec. 2, 2005

(65) Prior Publication Data
US 2006/0123082 A1 Jun. 8, 2006

Related U.S. Application Data

(60) Provisional application No. 60/632,824, filed on Dec. 3, 2004.

(51) Int. Cl.
*G06F 15/16* (2006.01)
(52) U.S. Cl. ........ 709/204; 709/218; 709/206; 709/227; 455/466; 370/401
(58) Field of Classification Search .................. 709/204, 709/230, 200, 205, 218, 206, 227; 455/466; 370/401
See application file for complete search history.

(56) References Cited

U.S. PATENT DOCUMENTS

| | | | |
|---|---|---|---|
| 5,893,083 A * | 4/1999 | Eshghi et al. | 706/45 |
| 5,943,478 A | 8/1999 | Aggarwal et al. | 395/187.01 |
| 6,353,660 B1 * | 3/2002 | Burger et al. | 379/88.17 |
| 6,456,699 B1 | 9/2002 | Burg et al. | 379/88.17 |
| 6,484,196 B1 | 11/2002 | Maurille | 709/206 |
| 6,549,937 B1 | 4/2003 | Auerbach et al. | |
| 6,654,790 B2 * | 11/2003 | Ogle et al. | 709/206 |
| 6,668,167 B2 * | 12/2003 | McDowell et al. | 455/412.1 |
| 6,721,410 B1 | 4/2004 | Will | |
| 6,769,123 B1 | 7/2004 | Chan | 719/315 |
| 6,912,563 B1 * | 6/2005 | Parker et al. | 709/204 |

(Continued)

FOREIGN PATENT DOCUMENTS

| | | |
|---|---|---|
| EP | 1545087 | 6/2005 |
| WO | WO2006060744 | 6/2006 |

OTHER PUBLICATIONS

Extended European Search Report dated Aug. 13, 2010 for International Application No. PCT/US2007/010532.

(Continued)

*Primary Examiner* — Tammy Nguyen
(74) *Attorney, Agent, or Firm* — Brundidge & Stanger, P.C.

(57) ABSTRACT

A real-time messaging system and method for a plurality of users that obviates the need to install specialized, dedicated software on user computers, and renders the need to become a subscriber of the system unnecessary. The real-time messaging system is a rules-based system that applies a set of rules and user attributes to the availability status of the users to facilitate effective real-time communications between the users. The system allows each user to indicate his or her on-line presence via a hyperlink embedded in and displayable on a web page, an e-mail message, or other hyperlink-supporting document. Each hyperlink is associated with a URL that points to a document such as a web page configured to initiate an on-line meeting or teleconference. A user who wishes to participate in an on-line meeting or teleconference selects a hyperlink corresponding to a particular user or user group, thereby initiating the desired on-line meeting or teleconference.

44 Claims, 13 Drawing Sheets

U.S. PATENT DOCUMENTS

| | | | |
|---|---|---|---|
| 7,103,846 B1 | 9/2006 | Shafrir et al. | 715/751 |
| 7,149,288 B2 | 12/2006 | Digate et al. | |
| 7,263,545 B2 | 8/2007 | Digate et al. | |
| 7,418,439 B2* | 8/2008 | Wong | 1/1 |
| 7,849,178 B2* | 12/2010 | Shen et al. | 709/223 |
| 2002/0042830 A1* | 4/2002 | Bose et al. | 709/230 |
| 2002/0078153 A1 | 6/2002 | Chung et al. | |
| 2002/0083119 A1* | 6/2002 | Matsui et al. | 709/200 |
| 2002/0083127 A1 | 6/2002 | Agrawal | |
| 2002/0130904 A1* | 9/2002 | Becker et al. | 345/753 |
| 2002/0165000 A1 | 11/2002 | Fok | |
| 2003/0041092 A1* | 2/2003 | Woo | 709/200 |
| 2003/0083079 A1 | 5/2003 | Clark et al. | |
| 2003/0088623 A1* | 5/2003 | Kusuda | 709/204 |
| 2003/0097408 A1* | 5/2003 | Kageyama et al. | 709/205 |
| 2003/0105820 A1 | 6/2003 | Haims et al. | |
| 2003/0191676 A1 | 10/2003 | Templeton | |
| 2003/0195928 A1* | 10/2003 | Kamijo et al. | 709/204 |
| 2003/0229670 A1 | 12/2003 | Beyda | |
| 2003/0231647 A1 | 12/2003 | Petrovykh | |
| 2003/0236086 A1* | 12/2003 | Litwin, Jr. | 455/412.1 |
| 2004/0068567 A1* | 4/2004 | Moran et al. | 709/227 |
| 2004/0141508 A1* | 7/2004 | Schoeneberger et al. | 370/401 |
| 2004/0152477 A1* | 8/2004 | Wu et al. | 455/466 |
| 2004/0161080 A1* | 8/2004 | Digate et al. | 379/88.17 |

OTHER PUBLICATIONS

Office Action dated Jul. 12, 2010 for U.S. Appl. No. 12/463,200.
Office Action dated Aug. 4, 2010 for U.S. Appl. No. 10/367,640.
Restriction Requirement dated Sep. 29, 2010 for U.S. Appl. No. 11/293,035.
Final Office Action dated Sep. 8, 2010 for U.S. Appl. No. 11/406,064.

* cited by examiner

INITIATING AN ON-LINE MEETING VIA A WEB PAGE LINK

CROSS REFERENCE TO RELATED APPLICATIONS

This application claims benefit of U.S. Provisional Patent Application No. 60/632,824 filed Dec. 3, 2004 entitled SYSTEM AND METHOD OF INITIATING AN ON-LINE MEETING OR TELECONFERENCE VIA A WEB PAGE LINK OR A THIRD PARTY APPLICATION.

STATEMENT REGARDING FEDERALLY SPONSORED RESEARCH OR DEVELOPMENT

N/A

BACKGROUND OF THE INVENTION

The present invention relates generally to real-time communications systems, and more specifically to a real-time communications system in which a hyperlink on a web page, an e-mail message, or other hyperlink-supporting document may be employed to indicate the on-line presence of a user, and to initiate an on-line meeting or teleconference between multiple users when selected by a mouse or other user input device.

U.S. patent application Ser. No. 10/731,872 filed Dec. 9, 2003 entitled RULES BASED REAL-TIME COMMUNICATION SYSTEM and assigned to the same assignee of the present invention ("the '872 application") discloses a real-time messaging system that facilitates real-time convening of teleconferences and other forms of on-line communications between multiple users. As disclosed in the '872 application, the real-time messaging system includes a plurality of client or user computers communicably coupleable to a real-time messaging server computer via a communications network. The real-time messaging system maintains and stores an availability status in association with each system user. In the context of the disclosed real-time messaging system, the availability status of a system user generally corresponds to what is commonly referred to as the on-line presence of that user. The real-time messaging server is operative to apply a set of rules and user attributes to the availability status of the system users to find appropriate users and/or user groups, and to invite them to join a particular on-line meeting or teleconference.

In a typical mode of operation, to initiate a real-time on-line meeting, a user generates a request to convene the meeting by entering information into the real-time messaging system via a graphical user interface (GUI) provided on a client or user computer. For example, the user may enter a list of desired invitees or participants for the on-line meeting. It is understood that each meeting invitee or participant corresponds to a user of a computer coupled to the network. The user may also enter a number of attributes associated with the meeting request (e.g., the meeting topic, location, time, and/or priority) and one or more of the meeting participants (e.g., the function or role of a participant, and/or an indication of whether or not the presence of a participant is necessary for the meeting to convene). Next, the system identifies the initial members of a participant group, and determines whether each user within the participant group is available to participate in the meeting. Such availability of the participant group members can be determined based on user-defined availability filtering, and/or the attributes associated with the meeting request, e.g., which user requested the meeting, the meeting topic, and/or whether or not the user is a necessary participant in the meeting.

In the event one or more members of the participant group are currently unavailable, the real-time messaging system determines whether there are any acceptable stand-ins for the unavailable group members. If there is an acceptable stand-in for an unavailable group member, then the system determines whether that stand-in is available to participate in the meeting. In the event the stand-in is available, the system determines whether or not that user agrees to be a stand-in for the unavailable group member. The system then substitutes all acceptable, available, and agreeing stand-ins for the unavailable members of the participant group. Finally, if there is a sufficient number of members of the participant group available, and all members of the participant group deemed necessary are available, then the real-time messaging system convenes the requested on-line meeting.

One drawback of the real-time messaging system disclosed in the '872 application is that each user who wishes to initiate an on-line meeting or teleconference is typically required to become a subscriber or a registered user of the real-time messaging system. For example, each subscriber may be required to provide account information, and information relating to stand-in definitions, availability filters, and/or contact lists of other subscribers as well as non-subscribers. In addition, each subscriber of the real-time messaging system is typically required to install specialized, dedicated software on his or her computer to allow him or her to access the features of the real-time messaging system. For example, such software may be operative to obtain instantaneous availability information for the various subscribers, including event notifications indicating when a user logs on or off a client system. However, requiring users to subscribe to the real-time messaging system and to install specialized, dedicated software on their computer equipment to access the system features significantly limits the overall utility of the system.

It would therefore be desirable to have an improved real-time messaging system for a plurality of users that obviates the need to become a subscriber or a registered user of the system. Such an improved real-time messaging system would also render the need to install specialized, dedicated software on the user computers unnecessary, while avoiding other drawbacks of conventional real-time messaging systems.

BRIEF SUMMARY OF THE INVENTION

In accordance with the present invention, a real-time messaging system and method for a plurality of users is provided that obviates the need to install specialized, dedicated software on the user computers, and renders unnecessary the need to become a subscriber or a registered user of the system. In one embodiment, the real-time messaging system is a rules-based system operative to apply a set of rules and user attributes to the availability status of the system's users to facilitate effective real-time communications among the multiple users. The system allows each user to indicate his or her on-line presence via a hyperlink embedded in and displayable on one or more web pages, e-mail messages, or other hyperlink-supporting documents. In the presently disclosed embodiment, the hyperlink has an associated area defined by an icon and/or an alphanumeric string. Each icon or string is hyperlinked via a uniform resource locator (URL) to a document (e.g., a web page) configured to initiate an on-line meeting or teleconference. A system user or other individual who wishes to participate in an on-line meeting or teleconference with a particular user or group of users selects the icon or string associated with that user or user group, e.g., by clicking on the icon or string using a mouse or any other suitable user input device, thereby initiating the desired on-line meeting or teleconference.

In one embodiment, the real-time messaging system includes a plurality of client or user computers, at least one real-time messaging server computer, at least one gateway server computer, a presence server computer, a database server computer, and at least one communications network. For example, the plurality of user computers may include a PC client, a Flash client, a mobile client, a browser client, and/or a web services client. The real-time messaging server comprises software components including a rules engine having a plurality of functional units, and a plurality of object definitions associated with the functional units of the rules engine. The system is operative to allow the plurality of user computers to communicate with the real-time messaging server over the communications network. Such communications between the user computers and the real-time messaging server are performed through a client abstraction layer including a Macromedia Flash™ Media Server and a web server. For example, the PC client, the Flash client, and the mobile client may communicate with the real-time messaging server through the Flash Media Server, and the browser client and the web services client may communicate with the real-time messaging server through the web server. In the presently disclosed embodiment, on-line presence and meeting request messages originating from the PC, Flash, and mobile clients are passed from the Flash Media Server directly to the rules engine of the real-time messaging server, and on-line presence and meeting request messages originating from the browser and web services clients are passed from the web server to the rules engine via the gateway server. On-line presence data contained in the on-line presence messages are stored within the presence server, and data relating to the rules, the users, user stand-ins, the user groups, user preferences and group definitions, and internal and/or external data sources are stored in the database server. The data stored within the database server are accessible by the system through a data source layer that provides data mining capabilities.

In one mode of operation, a first user (a "caller") initiates an on-line meeting with at least one second user (a "recipient") via the real-time messaging system. Both the caller and the recipient are users of respective client computers communicably coupled to the communications network. Specifically, the caller accesses a first web page via his or her computer upon which an icon is displayed, indicating the on-line presence of the recipient. Next, the caller clicks on the icon, which is hyperlinked to a URL that points to a second web page containing a form prompting the caller to provide one of two categories of information based on whether or not he or she is a subscriber or a registered user of the system. In another embodiment, the caller uses a third party application running on his or her computer to connect to the real-time messaging system over a standards-based communications network such as the Internet. If the caller is a subscriber of the real-time messaging system, then the form is configured to prompt the caller to enter a username and a user password to allow the system to authenticate the caller, and, in the event the caller is authenticated, to prompt the caller to enter a topic of the desired on-line meeting. Alternatively, if the caller is not a subscriber of the system, then the form is configured to prompt the caller to enter his or her name and e-mail address, and the topic of the desired on-line meeting. After entering the required information into the real-time messaging system via the displayed form, the caller waits for a period of time while the system performs one of two sequences of process steps based on whether the recipient is an individual or represents a "lifeline", which is defined herein as a list of users having a name and one or more ordering attributes associated therewith. For example, a lifeline corresponding to a list of users within a technical sales support group for a given product may have the name "product_A_tech", and may be referred to as the product_A_tech lifeline.

In the event the recipient is an individual and the on-line presence of that individual indicates that he or she is currently on-line or "available", the real-time messaging system performs a first sequence of process steps including causing a first window (a first "toast") to open (to "pop up") on the display of the recipient's computer, thereby announcing the caller's invitation to join the on-line meeting. If the recipient clicks on the first toast, then the system causes a first dialog box to appear on the recipient's computer display indicating the caller's name and the topic of the desired on-line meeting. The first dialog box includes at least one button that may be clicked on by the recipient to accept or reject the caller's invitation to join the on-line meeting. If the caller is not a subscriber of the real-time messaging system, then the first dialog box provides a message warning the recipient that the caller is not an authenticated user of the system. In the event the recipient represents a lifeline, the real-time messaging system performs a second sequence of process steps including causing a second toast to pop up on the computer display of a specified one of the users listed in the lifeline. If the specified user listed in the lifeline clicks on the second toast, then the system causes a second dialog box to appear on that user's computer display indicating the caller's name and the topic of the desired on-line meeting.

If the recipient does not accept the caller's invitation to join the on-line meeting within a predetermined time period, then a message is provided on the caller's computer display indicating that the recipient is currently off-line, busy, does not want to be disturbed, or is otherwise "unavailable". Alternatively, if the recipient accepts the caller's invitation to join the on-line meeting, then a third window opens on the recipient's computer display, after which a fourth window opens on the caller's computer display, thereby convening the on-line meeting of the caller and the recipient over the network. For example, messages in the form of text messages, audible speech, and/or visual images including video images of the caller and/or the recipient may be exchanged between the respective users of the real-time messaging system via user interaction with the third and fourth windows, which are referred to herein as the meeting windows.

By allowing each user of the real-time messaging system to indicate his or her on-line presence via a hyperlink embedded in and displayable on a web page, an e-mail message, or other hyperlink-supporting document, a user who wishes to participate in an on-line meeting or teleconference with a particular user or user group can select the hyperlink associated with that user or user group to initiate the desired on-line meeting or teleconference. Such a mechanism of initiating an on-line meeting or teleconference does not require the user to become a subscriber or a registered user of the system, nor does it require the user to install specialized, dedicated software on his or her computer to access the system features. As a result, the overall utility of the system is enhanced.

Other features, functions, and aspects of the invention will be evident from the Detailed Description of the Invention that follows.

BRIEF DESCRIPTION OF THE SEVERAL VIEWS OF THE DRAWINGS

The invention will be more fully understood with reference to the following Detailed Description of the Invention in conjunction with the drawings of which.

DETAILED DESCRIPTION OF THE INVENTION

The entire disclosure of U.S. Provisional Patent Application No. 60/632,824 filed Dec. 3, 2004 entitled SYSTEM AND METHOD OF INITIATING AN ON-LINE MEETING OR TELECONFERENCE VIA A WEB PAGE LINK OR A THIRD PARTY APPLICATION is incorporated herein by reference.

A real-time messaging system and method for initiating an on-line meeting or teleconference between multiple users is provided that obviates the need to install specialized, dedicated software on the user computers, and renders unnecessary the need to become a subscriber or a registered user of the system. The real-time messaging system allows each user of the system to indicate his or her on-line presence via a hyperlink embedded in and displayable on a web page, an e-mail message, or other hyperlink-supporting document. Each system user or other individual who wishes to participate in an on-line meeting or teleconference with a particular user or group of users selects the hyperlink associated with that user or user group to initiate the desired on-line meeting or teleconference.

Figure 1:
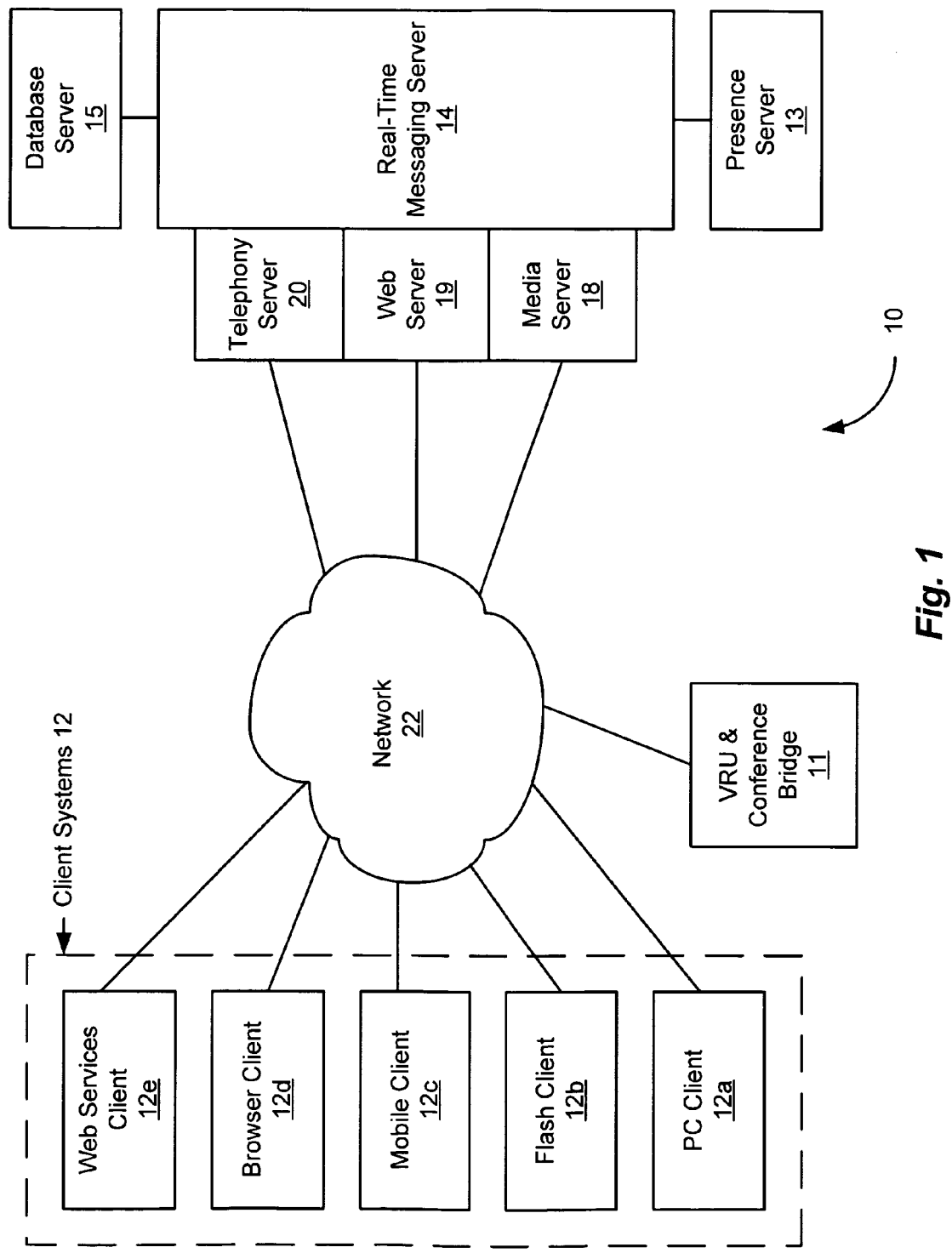
FIG. 1 is a block diagram illustrating a real-time messaging system according to the present invention, in which a number of real-time messaging client systems are interconnected with a real-time messaging server via a communications network.

FIG. 1 depicts an illustrative embodiment of a real-time messaging system 10, in accordance with the present invention. As shown in FIG. 1, the real-time messaging system 10 includes a plurality of client systems 12, a voice response unit (VRU) and conference bridge 11, at least one real-time messaging server 14, a media server 18, a web server 19, a telephony server 20, a presence server 13, a database server 15, and a communications network 22. For example, the communications network 22 may comprise the Internet. Further, the plurality of client systems 12 may include a PC client computer 12a, a device 12b running the Macromedia Flash Player™ application ("Flash client"), a mobile client computer 12c, a browser client computer 12d, and a web services client computer 12e, each of which is communicably coupleable to the communications network 22. The media server 18, the web server 19, and the telephony server 20 are also communicably coupleable to the network 22.

In the presently disclosed embodiment, the PC client 12a, the Flash client 12b, and the mobile client 12c are operative to communicate with the real-time messaging server 14 over the network 22 through the media server 18, which may comprise any suitable type of media server such as the Flash™ Media Server sold by Macromedia™, Inc., San Francisco, Calif., U.S.A. Further, the browser client 12d and the web services client 12e are operative to communicate with the real-time messaging server 14 over the network 22 through the web server 19, which may comprise any suitable type of web server such as the Internet information server (IIS) sold by Microsoft™ Corporation, Redmond, Wash., U.S.A., the Websphere™ server sold by International Business Machines™ (IBM) Corporation, Armonk, N.Y. U.S.A., or the WebLogic™ server sold by BEA Systems™, Inc., San Jose, Calif., U.S.A. Moreover, the VRU and conference bridge 11 is operative to communicate with the real-time messaging server 14 over the network 22 through the telephony server 20.

It is understood that the client systems 12a-12e, the VRU and conference bridge 11, and the server systems 14 and 18-20 may be embodied as one system or as separate computer systems, each including one or more processors, program code memory, one or more secondary program code storage devices, a number of input/output interface devices, and operating system and application program software, as configured for a given operational environment. In the presently disclosed embodiment, the communication server 18 and the web server 19 are operative to execute web server software, and may incorporate a hyper-text transport protocol (HTTP) server for managing web page requests received over the network 22, and for delivering hyper-text mark-up language (HTML) documents in response to the web page requests. It is noted that the client systems 12 are not required to execute specialized, dedicated client-side application software to access the features provided by the real-time messaging system 10. Instead, messages and content used to access the system features may be loaded and processed within the client systems, as needed, using known client-side application software, such as Flash™ or Java™ application software operative to provide text, video, and/or other content in an interactive graphics format through web content downloaded to a browser program executing on the client system. In addition, the communication server 18 and the web server 19 may employ known protocols such as the real-time messaging protocol (RTMP) for interfacing to the client systems.

In one mode of operation, the real-time messaging system 10 provides real-time messaging functionality between the users of the client systems 12 and optionally the users of the VRU and conference bridge 11 based on a plurality of rules and a rules engine implemented within the real-time messaging server 14. The real-time messaging system 10 is operative to provide such real-time messaging in response to a number of monitored conditions, such as the availability status of the users and the detection of one or more predetermined events. Such real-time messaging facilitates rapid initiation of on-line meeting or teleconference convocation by contacting the users required for the on-line meeting based on dynamically determined group memberships, at least in part as a function of which users are currently available to participate in the meeting.

In the presently disclosed embodiment, the real-time messaging system 10 allows stand-ins to be substituted for members of participant groups that are determined to be unavailable. Such user stand-ins may be automatically selected based on matches between their roles, expertise, and/or preferences relative to the requirements of a specific on-line meeting. Stand-ins may also be automatically selected based on stand-in designations made by individual users, as represented by data stored on the real-time messaging server 14. For example, the disclosed system may provide for selective stand-in designations as a function of the topic of a given on-line meeting. In addition, the disclosed system may provide for transitivity of stand-in designations between users or groups of users, resulting in an increased ability to provide a given inquiry quickly to the most appropriate user. In one embodiment, the disclosed system allows users to make express invitations to stand-ins, and/or to make express selections of stand-ins. Such stand-in invitations and/or selections can be made via a dialog box within a graphical user interface (GUI) of the client system. For example, the dialog box may list the individuals included in a particular meeting invitation, and may allow a user to invite only those listed individuals who are currently available, to invite all of the listed individuals whether or not they are currently available, or to select stand-ins for the listed individuals who are currently unavailable.

The real-time messaging system 10 also provides a number of features relating to user groups. For example, the disclosed system permits group definitions to be shared among multiple users. Further, temporary membership in a particular group may be enabled to grant temporary access to data and/or specific functions associated with that group. Moreover, to determine the most appropriate users for a particular group or the most appropriate stand-in for a particular user, the disclosed system may provide data mining capabilities for relevant skills assessment, e.g., by identifying one or more users who recently published a document on a given topic or who responded to a message on a given topic. Such features of the disclosed system relating to real-time messaging, stand-ins, and user groups are further described in co-pending U.S. patent application Ser. No. 10/731,872 filed Dec. 9, 2003 entitled RULES BASED REAL-TIME COMMUNICATION SYSTEM ("the '872 application"), the entire disclosure of which is incorporated herein by reference.

Figure 2:
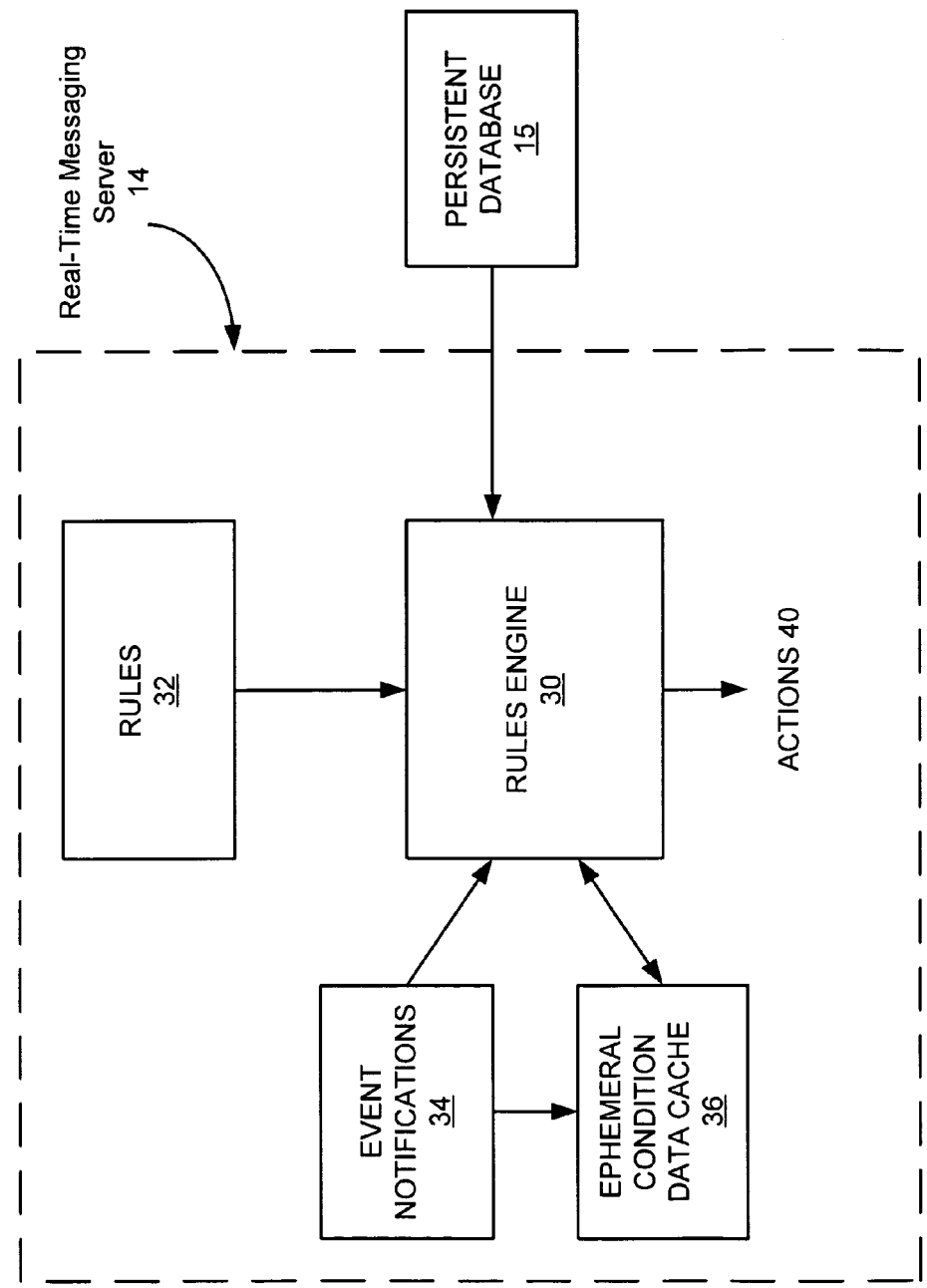
FIG. 2 is a block diagram illustrating the real-time messaging server of FIG. 1.

FIG. 2 depicts an illustrative software configuration of the real-time messaging server 14 (see also FIG. 1). In the illustrated embodiment, the software configuration includes a rules engine 30 operative to process a plurality of rule definitions 32. In the illustrated embodiment, the rules engine 30 is responsive to event notifications 34 and the contents of an ephemeral condition data cache 36. The rules engine 30 is further responsive to the contents of the persistent database 15, which may, for example, be stored on a separate database server system (see also FIG. 1). In an alternative embodiment, the rules 32 may be provided within the rules engine 30 itself. The ephemeral condition data cache 36 includes presence indications for multiple users of the disclosed system. Such presence indications reflect the instantaneous on-line availability of the system users. It is understood that the ephemeral condition data cache 36 may be implemented on a separate data storage server system such as the presence server 13 (see FIG. 1). The persistent database 15 is operative to store configuration data reflecting user preferences and user group definitions. For example, such configuration data may include data relating to stand-in definitions, availability filters, and/or contact lists of the various system users. The rules 32 define a plurality of actions 40 that are performed in response to the event notifications 34, information provided by the ephemeral condition data cache 36, and/or information provided by the persistent database 15. The rules 32 are processed by the rules engine 30, which may be implemented using any suitable programming language. For example, the actions 40 performed by the rules engine 30 may include actions facilitating real-time group activities such as convening an on-line meeting or teleconference, sending e-mail or instant messages to one or more system users, and/or routing a document. The various actions 40 may range from simple to complex actions, and may include multi-stage actions that are performed in several distinct steps, depending at least in part upon the receipt of separate event notifications and the state of conditions stored in the ephemeral condition data cache 36 over time. The software components of the real-time messaging server 14 are further described in the above-referenced '872 application.

Figure 3:
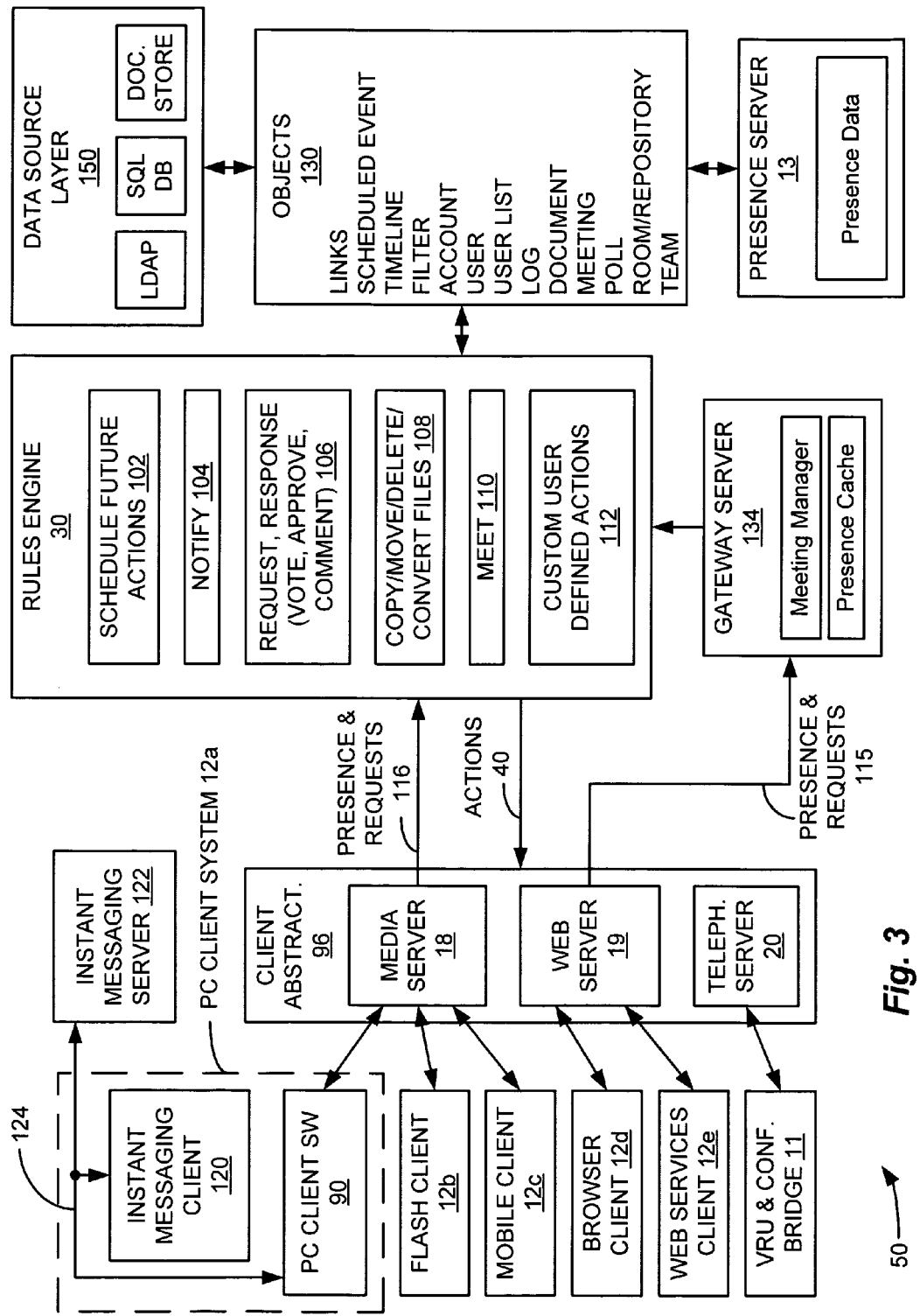
FIG. 3 is a block diagram illustrating the structure and operation of the real-time messaging system of FIG. 1.

FIG. 3 depicts an illustrative embodiment of an architecture 50 of the presently disclosed real-time messaging system, including a representation of the rules engine 30 (see also FIG. 2). In the illustrated embodiment, the rules engine 30 includes a plurality of functional units, each of which is operative to perform one or more real-time communications activities. In one embodiment, the plurality of functional units includes a schedule future actions unit 102 for scheduling actions to be performed at later points in time, a notify unit 104 for performing notification actions, a request, response (vote, approve, comment) unit 106 supporting certain types of request and response actions relating to voting, approval, and commenting, a copy/move/delete/convert files unit 108 supporting file operations performed by the rules engine 30, a meet unit 110 for convening meetings, and a custom user defined actions unit 112. It should be noted that the specific functional units included in the rules engine 30 of FIG. 3 are described herein for purposes of illustration only, and that any suitable functional units may be included within the rules engine 30 for a given embodiment. The various functional units included in the rules engine 30 define the processing performed by the rules engine 30, and reflect the specific set of rules loaded into the rules engine 30.

As shown in FIG. 3, the rules engine 30 interfaces to a data source layer 150 through a number of object definitions 130, which provide a predetermined interface to data sources such as an SQL database and a document storage database. It is understood that the data sources accessed via the data source layer 150 may be configured to store event data, ephemeral data, and/or persistent data. As described above, the disclosed system may provide data mining capabilities. To that end, the data source layer 150 can be configured to implement any suitable directory access protocol such as the lightweight directory access protocol (LDAP), which is a known Internet protocol that e-mail and other software programs may employ to look up information stored on a server. It is noted that, in addition to relational databases provided within the system for storing its own information, the data source layer 150 may also include external sources of data such as a corporate directory.

Within the architecture 50 of FIG. 3, communications between the client systems 12*a*-12*e*, the VRU and conference bridge 11, and the rules engine 30 are performed through a client abstraction layer 96, which includes the media server 18, the web server 19, and the telephony server 20 (see also FIG. 1). As shown in FIG. 3, the rules engine 30 is operative to receive and process presence information and meeting request messages 115-116. The presence information and meeting requests 116 originate from the PC client 12*a*, the Flash client 12*b*, and the mobile client 12*c*, and are passed directly to the rules engine 30 by the media server 18. Further, the presence information and meeting requests 115 originate from the browser client 12*d* and the web services client 12*e*, and are passed to the rules engine 30 via a gateway server 134.

The presence data 115-116 provided to the rules engine 30 via the client abstraction 96 are indicative of the on-line status of one or more users operating on one or more of the client systems 12a-12e. Moreover, the meeting requests 115-116 provided to the rules engine 30 via the client abstraction 96 may include requests for real-time group activities such as requests to convene on-line meetings or teleconferences and/or requests to send messages between system users. After processing the presence information and requests 115-116, the rules engine 30 issues the appropriate actions 40 back to the client systems 12a-12e via the client abstraction 96. For example, such actions may include real-time group actions relating to the convening of an on-line meeting or teleconference and/or the passing of messages between the system users.

In the presently disclosed embodiment, the PC client system 12a incorporates client software 90 and a third party instant messaging client 120. For example, the third party instant messaging client 120 may comprise any suitable instant messaging client software such as AIM™ (America-Online™ Instant Messenger), Yahoo Chat™, Microsoft MSN Messenger™, Microsoft Windows Messenger™, and/or IBM Lotus™ instant messaging and web conferencing client software. These and various other instant messaging systems are considered external to the disclosed real-time messaging system. The instant messaging client 120 communicates with an instant messaging server 122 over a communications network 124. In one embodiment, during operation of the disclosed system, the client software 90 intercepts communications between the instant messaging client 120 and the associated instant messaging server 122 to determine the on-line presence status of one or more users of the instant messaging client 120. The mechanism by which the real-time messaging system 10 (see FIG. 1) operates to determine user presence information from one or more separate instant messaging software systems is further described in the above-referenced '872 application.

As indicated above, the presence information stored within the real-time messaging system 10 (see FIG. 1) reflects the instantaneous on-line availability of the users of the system. In the presently disclosed embodiment, the on-line availability of each system user or user group is indicated via a hyperlink embedded in and displayable on a web page, an e-mail message, or other hyperlink-supporting document. The hyperlink has an associated area defined by an icon and/or an alphanumeric string, which is hyperlinked to a uniform resource locator (URL) pointing to a document (e.g., a web page) configured to initiate an on-line meeting or teleconference.

For example, the hyperlink and the characteristics of its associated icon or string may be defined by a code fragment (HTML or non-HTML) that may be embedded in or otherwise inserted (e.g., copied and pasted) into the document supporting the hyperlink. In one embodiment, each user who wishes to participate in an on-line meeting or teleconference with a particular user or group of users selects the icon or string associated with that user or user group, e.g., by clicking on the icon or string using a mouse or any other suitable user input device, thereby initiating the desired on-line meeting or teleconference. In an alternative embodiment, the user may employ a third party application, such as a third party browser client or web services application running on his or her computer, to initiate the on-line meeting or teleconference, e.g., by connecting to the real-time messaging system over a standards-based communications network such as the Internet.

Figure 4A:
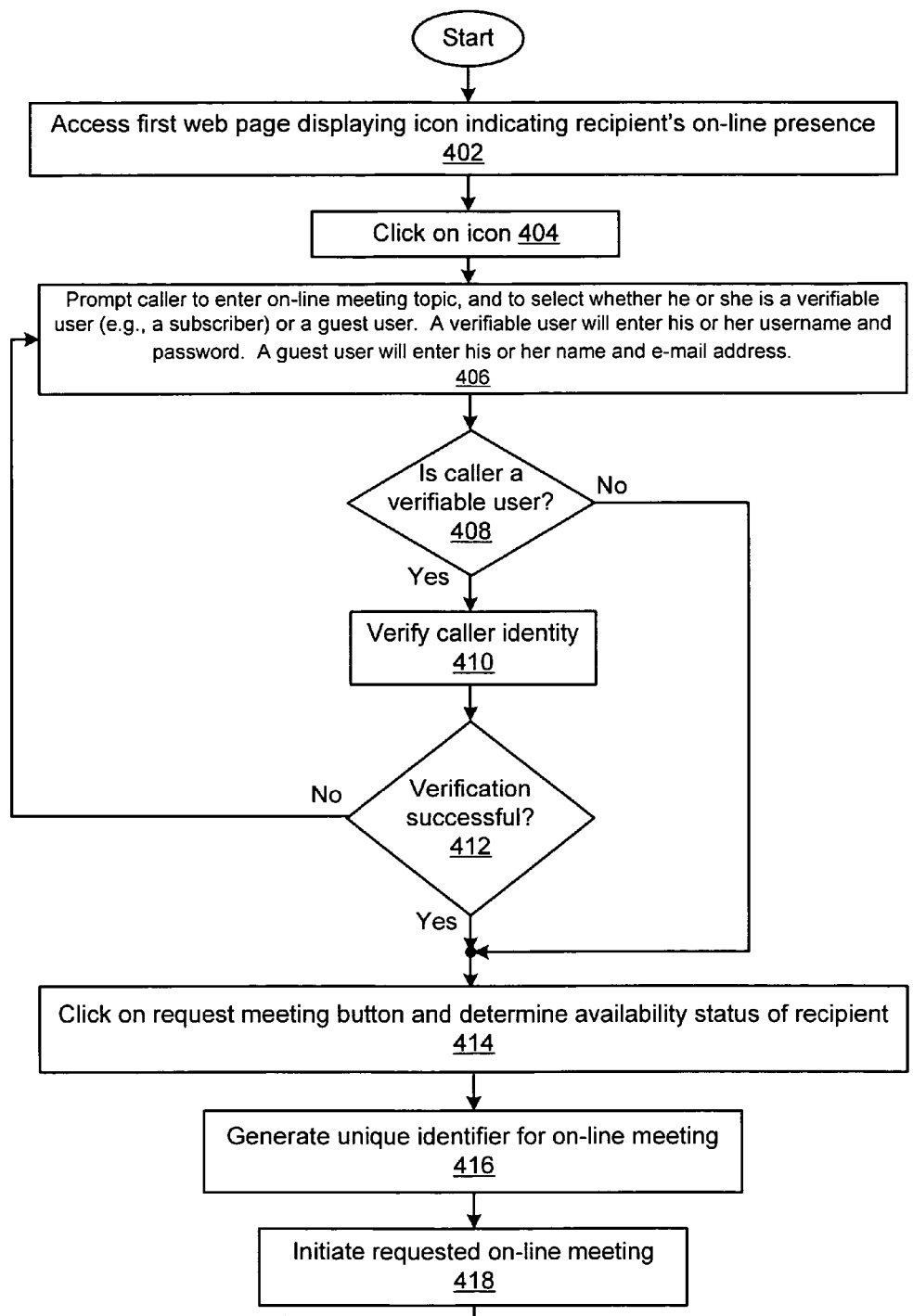
FIGS. 4a-4b are flow diagrams illustrating a method of operating the real-time messaging system of FIG. 1 to initiate an on-line meeting between two system users.
Figure 4B:
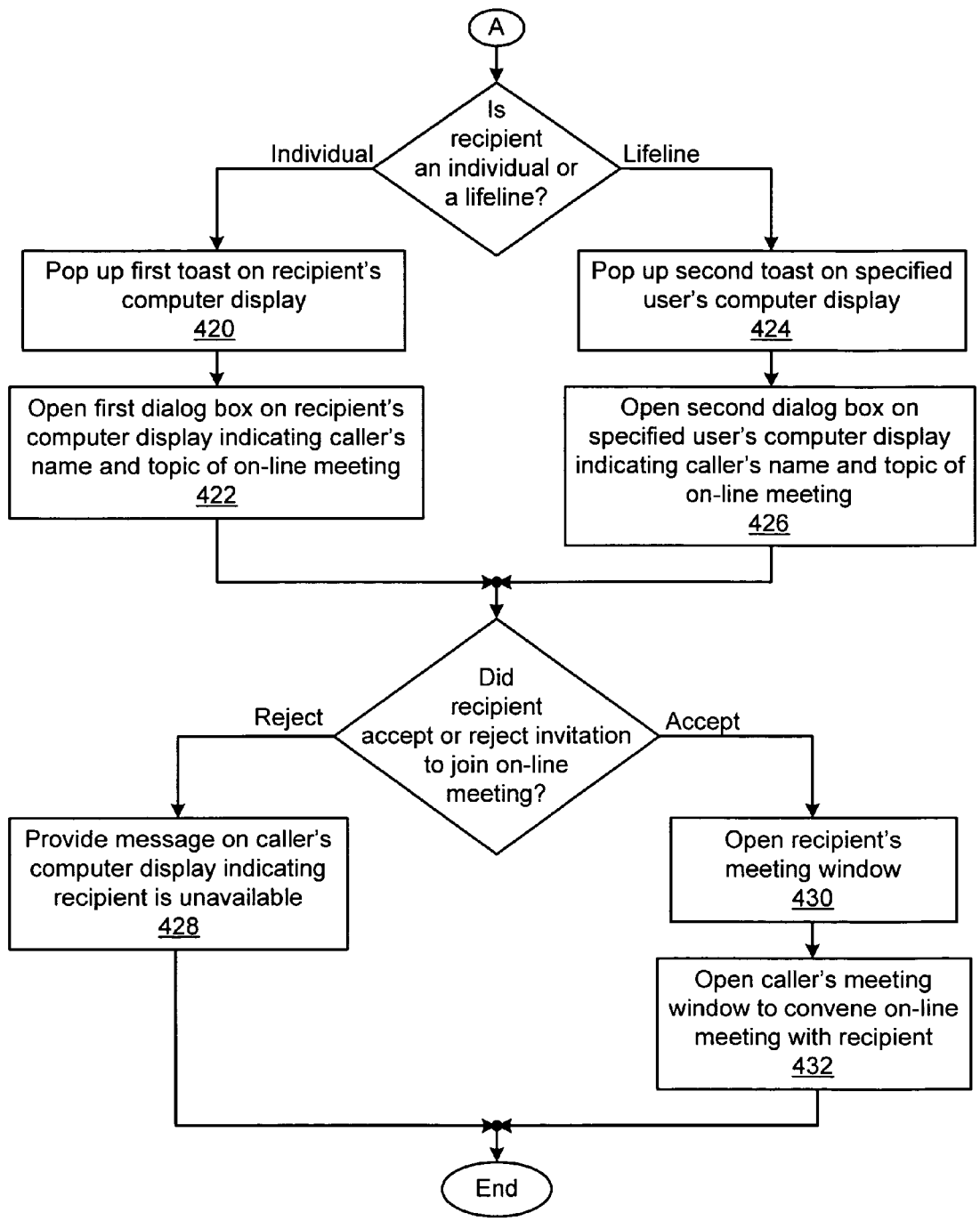

A method of operating the presently disclosed real-time messaging system to initiate an on-line meeting is illustrated by reference to FIGS. 3 and 4a-4b. In the presently disclosed method, the on-line meeting is initiated between users of the PC client 12a and the browser client 12d, which provide the presence and request messages 116, 115 to the rules engine 30 via the media server 18 and the gateway server 134, respectively. It is understood, however, that the on-line meeting may alternatively be initiated between any two or more of the users of the client systems 12a-12e (see FIG. 3). Specifically, a first system user (a "caller") attempts to initiate an on-line meeting with at least one second system user (a "recipient") by accessing a first web page upon which an icon is displayed indicating the on-line presence of the recipient, as depicted in step 402, and by clicking on the icon associated with the recipient, as depicted in step 404. The icon is hyperlinked via a URL to a second web page containing a form, which prompts the caller to enter a topic of the desired on-line meeting or teleconference, and to select whether he or she is a verifiable or authenticatable user (e.g., a subscriber) or a guest user, as depicted in step 406. In the presently disclosed embodiment, the form pointed to by the hyperlinked URL may be created using a standard content generation software application such as the Macromedia Flash™ software application, and may be displayed on the caller's computer display within a data rendering environment such as the Macromedia Flash Player™ data rendering environment. In the event the caller is a verifiable or authenticatable user, the form prompts the caller to enter a username and a user password to allow the system to verify/authenticate the caller. In the event the caller is a guest user and therefore not a verifiable/authenticatable user, the form prompts the caller to enter his or her name and e-mail address. Next, a determination is made, as depicted in step 408, as to whether the caller is a verifiable user or a guest user of the real-time messaging system. If the caller is a guest user, then the method branches to step 414. In the event the caller is a verifiable user, the system makes an attempt to verify the identity of the caller, as depicted in step 410. It is understood that any suitable verification or authentication mechanism or technique may be employed. A determination is then made as to whether or not the verification of the caller was successful, as depicted in step 412. If the verification was unsuccessful or not required, then the method loops back to step 406. In the event the verification was successful, the caller clicks on a "request meeting" button included in the form, and waits for a period of time while the system determines the availability status of the recipient based on whether the recipient is an individual or represents a lifeline, as depicted in step 414. As described above, a lifeline is a list of system users having a name and one or more ordering attributes associated therewith. In the event the recipient is an individual, the system makes a determination as to whether that individual is available or unavailable. Alternatively, if the recipient represents a lifeline, then the system determines whether a specified one of the users listed in the lifeline is available or unavailable. For example, the specified user in the lifeline may be determined based on the ordering attributes associated with the lifeline. It is noted that the system may determine the on-line presence of the individual or the specified user by checking the presence data stored on the presence server 13.

In the presently disclosed embodiment, attempts to initiate on-line meetings between callers and recipients, including determining the on-line presence of one or more of the recipients, are made at least in part by providing the presence and request messages 115-116 to the rules engine 30, which performs predefined actions in response to the presence and request messages 115-116. To avoid consuming too many system resources, these actions are cached using the presence cache included within the gateway server 134. Specifically, when a caller provides a presence and request message to the gateway server 134, the presence cache operates to determine whether or not the number of requests per unit time for this particular link has exceeded a predefined threshold, thereby indicating a potential overload or attempted denial-of-service attack. In the event the predefined threshold has been exceeded for this particular user, the presence cache returns a presence status value to the caller via the rules engine 30, indicating that the recipient is currently unavailable. If the predefined threshold has not been exceeded, then the presence cache operates to determine whether it has recently been updated with the status of the recipient's icon (e.g., enabled or disabled) and the status of the recipient (e.g., available or unavailable). In the event the presence cache has been recently updated with the icon and recipient status information, the presence cache returns the corresponding status values to the caller via the rules engine 30. Alternatively, if the presence cache has not been recently updated, then the presence cache fetches new status values for the recipient and his or her associated icon, stores the new status values, and returns the new status values to the caller via the rules engine 30.

In the event the recipient is currently available, the system generates a unique identifier for the requested on-line meeting using the meeting manager included within the gateway server 134, as depicted in step 416. It should be noted that the process of initiating an on-line meeting can take an indefinite amount of time since the process involves sending meeting requests to one or more system users, and waiting for their responses to the requests. Because the system provides a meeting identifier corresponding to each requested on-line meeting, the caller can use the meeting identifier for optionally canceling the meeting before the intended recipient responds to the meeting request, thereby avoiding the possibility of waiting an inordinate amount of time for the recipient's response. For example, the caller may click on a cancel button to cause the system to cancel the meeting request associated with that meeting identifier (see, e.g., FIG. 5c).

Next, the gateway server 134 provides the meeting identifier to the rules engine 30 to initiate the requested on-line meeting, as depicted in step 418. For example, the requested on-line meeting may be initiated via a JavaScript routine. It is noted that as the rules engine 30 performs the required actions to initiate the on-line meeting, it may send messages back to the meeting manager of the gateway server 134, including at least one of a meeting progress report, a meeting URL message, and at least one meeting accept/reject message. In the event any one of these messages indicate that the on-line meeting cannot proceed, e.g., the recipient rejects the caller's invitation to participate in the meeting, the rules engine 30 sends a message to the caller informing him or her that the recipient is unavailable. In one embodiment, the real-time messaging system causes the meeting request to be abandoned if the meeting cannot be successfully initiated within a predetermined time period, as determined by an internal or external watchdog timer. In addition, the system monitors the status of the network connections between the real-time messaging server and the caller's computer, and causes the meeting request to be abandoned if the caller's computer, i.e., the browser client 12d or the web services client 12e, has ceased communicating with the server. In the event the recipient is an individual and that individual is currently on-line and therefore available, the system causes a first window (a first "toast") to open ("pop up") on the display of the recipient's computer, thereby announcing the caller's invitation to join the on-line meeting, as depicted in step 420. After the recipient clicks on the first toast, the system causes a first dialog box to appear on the recipient's computer display indicating the caller's name and the topic of the desired on-line meeting or teleconference, as depicted in step 422. For example, the first dialog box may include at least one button that may be clicked on by the recipient to accept or reject the caller's invitation to join the on-line meeting. If the caller is not a subscriber of the real-time messaging system, then the first dialog box provides a message warning the recipient that the caller is an "anonymous" or "guest" user, i.e., the caller is not an authenticated system user. It is understood that if the recipient rejects the invitation to participate in the on-line meeting and that recipient has an acceptable and available stand-in, then the system causes the first toast to pop up on the computer display of the stand-in, thereby allowing the stand-in to access the first dialog box for accepting or rejecting the caller's invitation to participate in the on-line meeting.

In the event the recipient represents a lifeline and the specified user listed in the lifeline is available, the system causes a second toast to pop up on the computer display of the specified user, as depicted in step 424. After the specified user clicks on the second toast, the system causes a second dialog box to appear on that user's computer display indicating the caller's name and the topic of the desired on-line meeting, as depicted in step 426. In the event the recipient rejects the caller's invitation to participate in the on-line meeting or fails to accept the invitation within a predetermined time period, the system provides a message on the caller's computer display indicating that the recipient is currently off-line, busy, away, or otherwise unavailable, as depicted in step 428. It is understood that if the recipient represents a lifeline and the specified user listed in the lifeline rejects the invitation to participate in the on-line meeting, then the system causes the second toast to pop up on the computer display of a next specified user listed in the lifeline, if any, based on the ordering attributes associated with that lifeline.

In the event the recipient accepts the caller's invitation to join the on-line meeting, the system causes a third window (the recipient's meeting window) to open on the recipient's computer display, as depicted in step 430, after which the system causes a fourth window (the caller's meeting window) to open on the caller's computer display, as depicted in step 432, thereby convening the on-line meeting of the caller and the recipient over the network. For example, audible or visual messages in the form of text, video, and/or any other suitable content in an interactive graphics format, including video images of the caller and/or the recipient, may be exchanged between the users via their respective meeting windows during the course of the on-line meeting. It is noted that the caller or the recipient may click on a cancel button provided on their respective meeting windows to cause the system to cancel the on-line meeting associated with the meeting identifier, as described above.

Figure 5A:
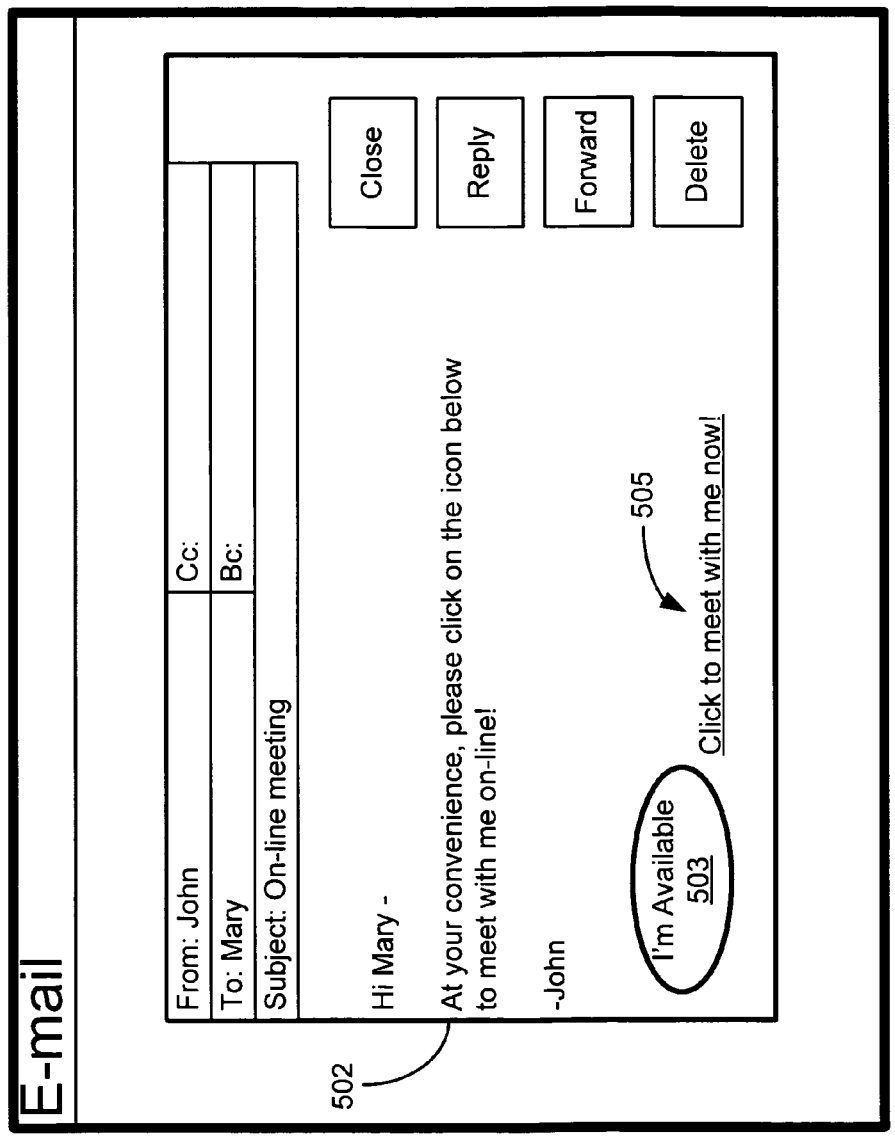
FIGS. 5a-5h are exemplary representations of computer display screens and windows displayed on client systems when initiating an on-line meeting between two system users, the on-line meeting being initiated using the real-time messaging system of FIG. 1.

The presently disclosed real-time messaging system will be better understood with reference to the following illustrative example and FIGS. 5a-5h, which depict exemplary computer display screens and windows displayed on client systems during the initiation of an on-line meeting between two representative client system users, namely, Mary and John. It is understood that the client systems and the real-time messaging server included in the real-time messaging system are communicably coupled to a communications network. FIG. 5a depicts the display screen of Mary's client system, which displays an e-mail message 502 sent by John to Mary. The e-mail message 502 includes the message "Hi Mary—At your convenience, please click on the icon below to meet with me on-line!—John". The e-mail message 502 also includes an icon 503, which includes the phrase "I'm Available", indicating the on-line presence of John's client system. It should be noted that if John's client system were currently off-line, or if John's system were on-line but John did not want to engage in an on-line meeting at this time, then the phrase on the icon 503 might alternatively be "Busy", "Do Not Disturb", "Unavailable", or any other suitable phrase and/or image. In addition, the e-mail message 502 includes a message 505 "Click to meet with me now!" It is noted that both the icon 503 and the message 505 may be hyperlinked to a URL pointing to a web page configured to initiate the on-line meeting between John and Mary.

Figure 5B:
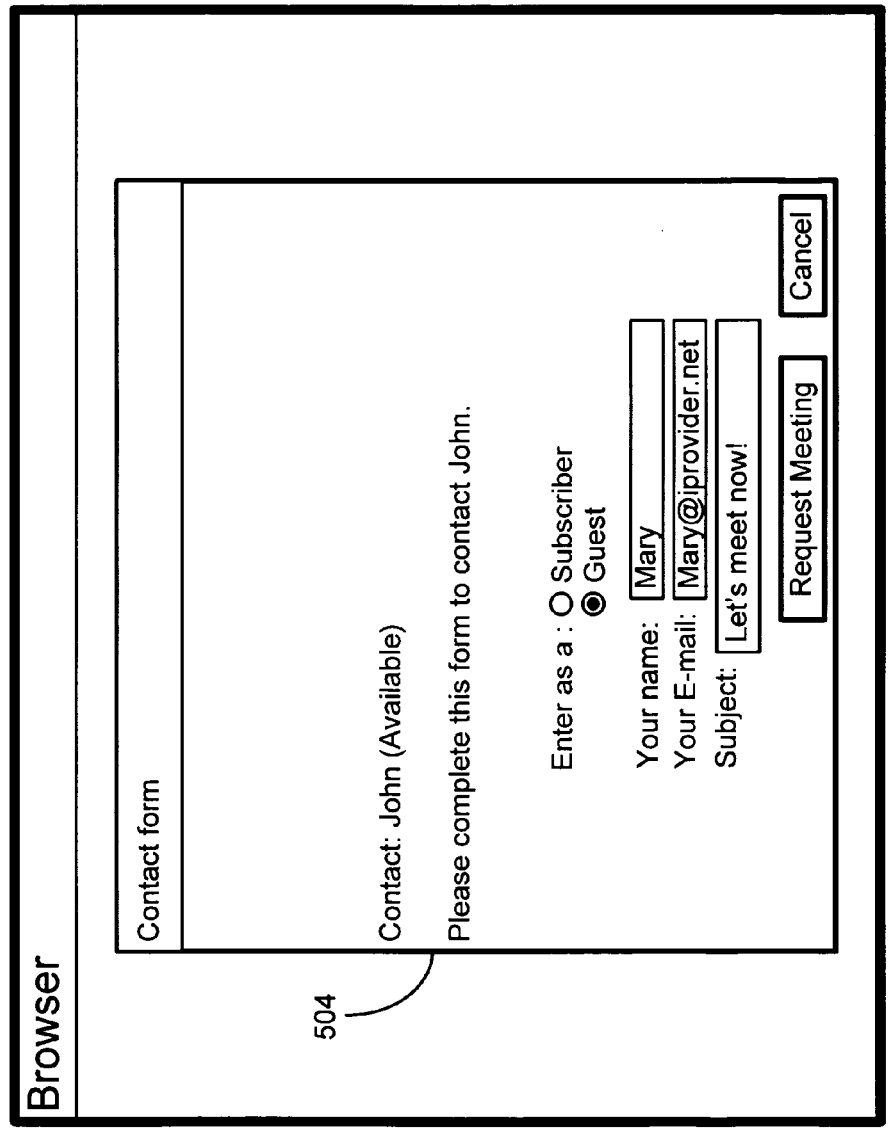

In the event Mary clicks on the icon 503 contained in the e-mail message 502, a web page 504 appears on the display screen of Mary's client system (see FIG. 5b). As shown in FIG. 5b, the web page 504 is a contact form, which prompts Mary to indicate whether she is a subscriber of the system or a guest user. Because Mary indicates that she is a guest user, the form prompts Mary to provide her name (Mary), her e-mail address (Mary@iprovider.net), and the topic of the on-line meeting ("Let's meet now!"). The contact form 504 includes a "request meeting" button and a "cancel" button.

Figure 5C:
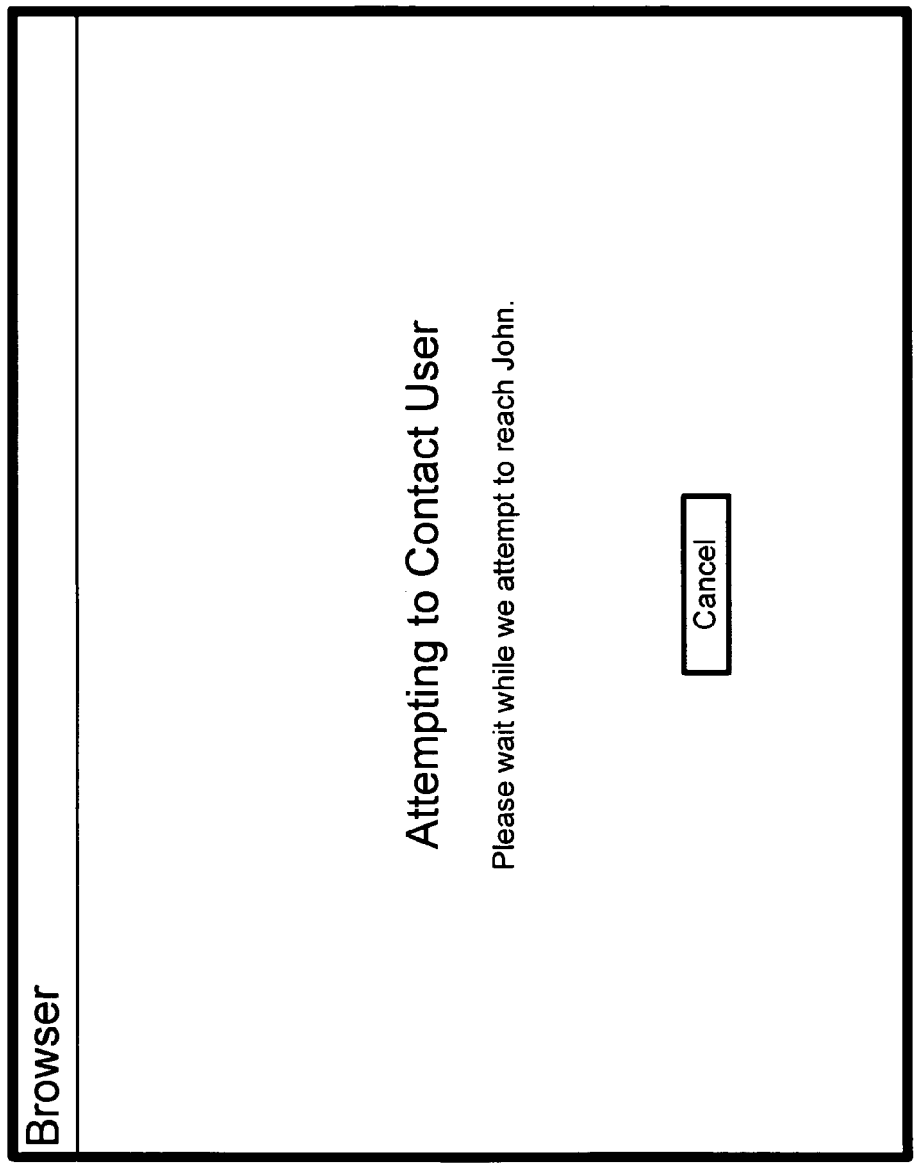
Figure 5D:
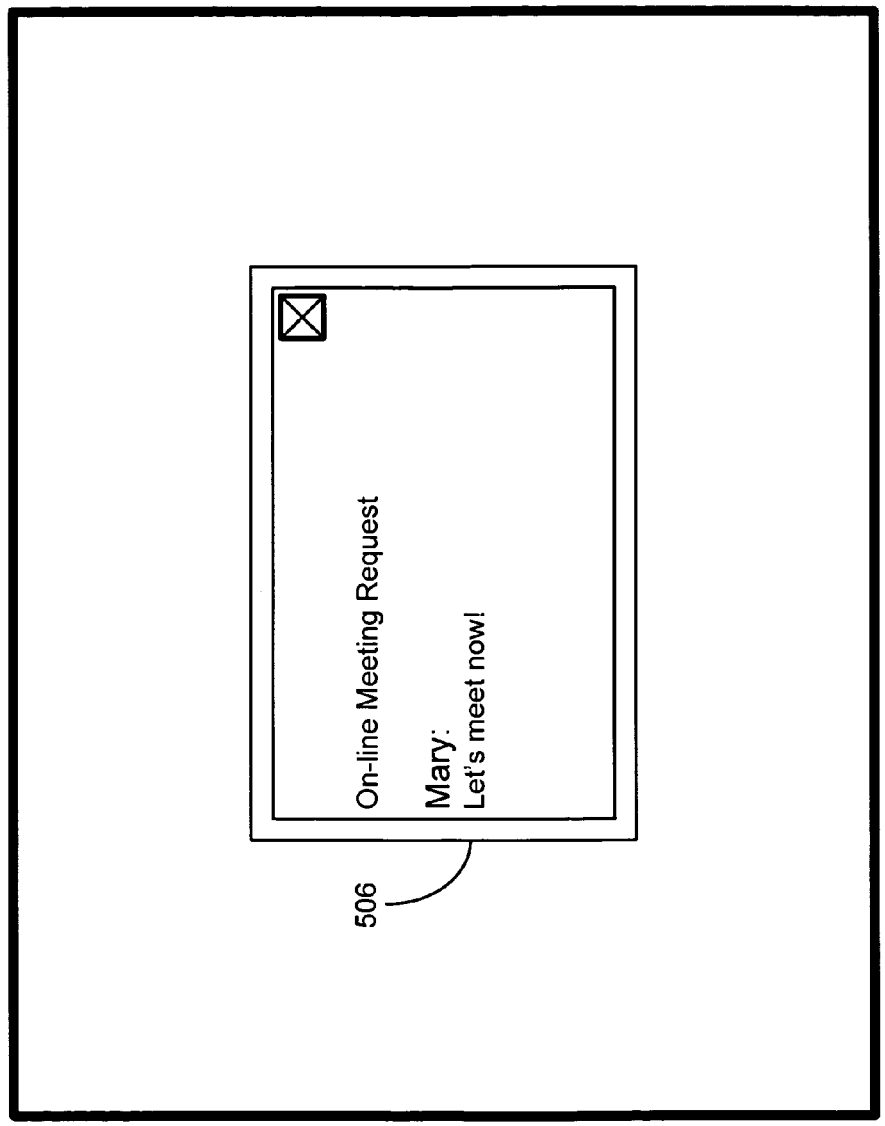
Figure 5E:
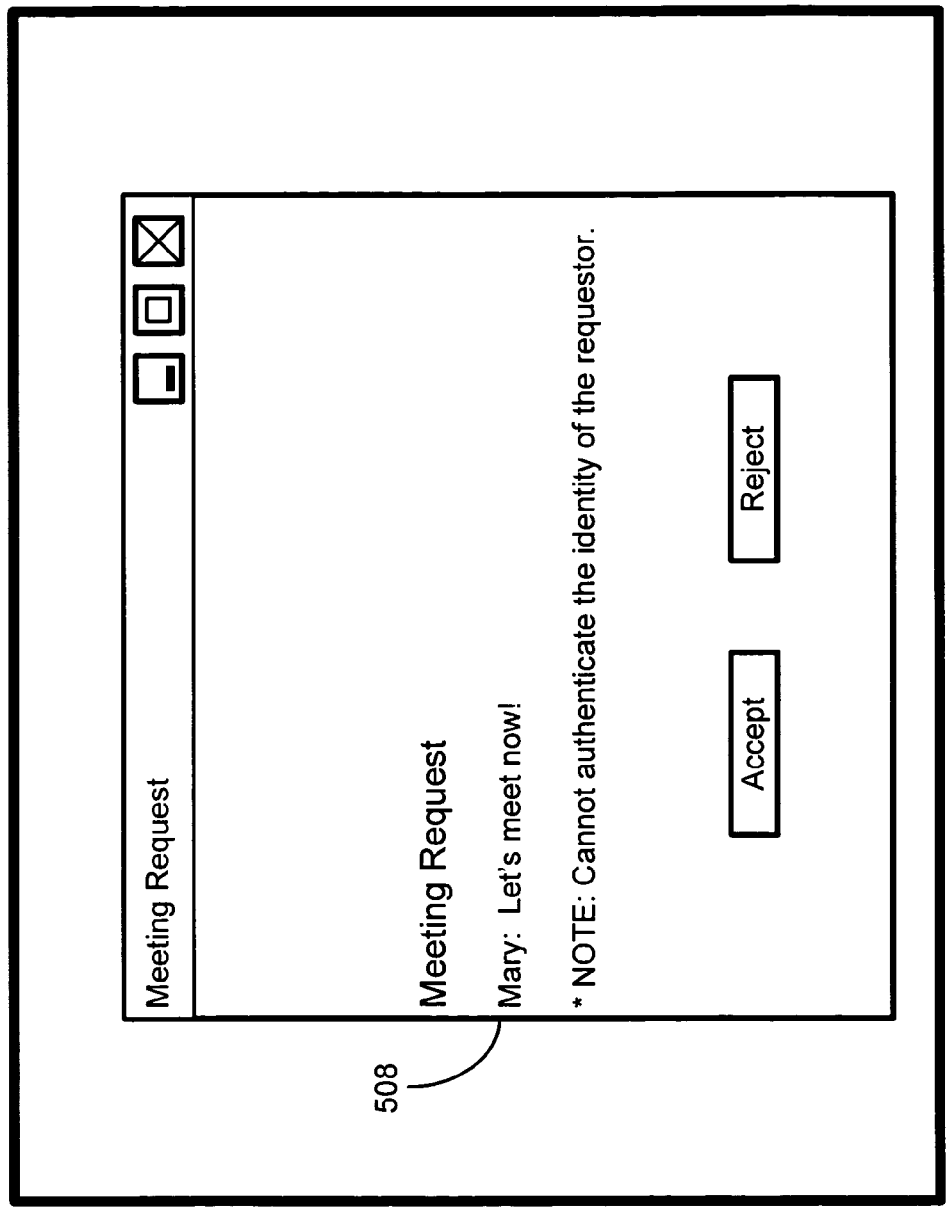
Figure 5F:
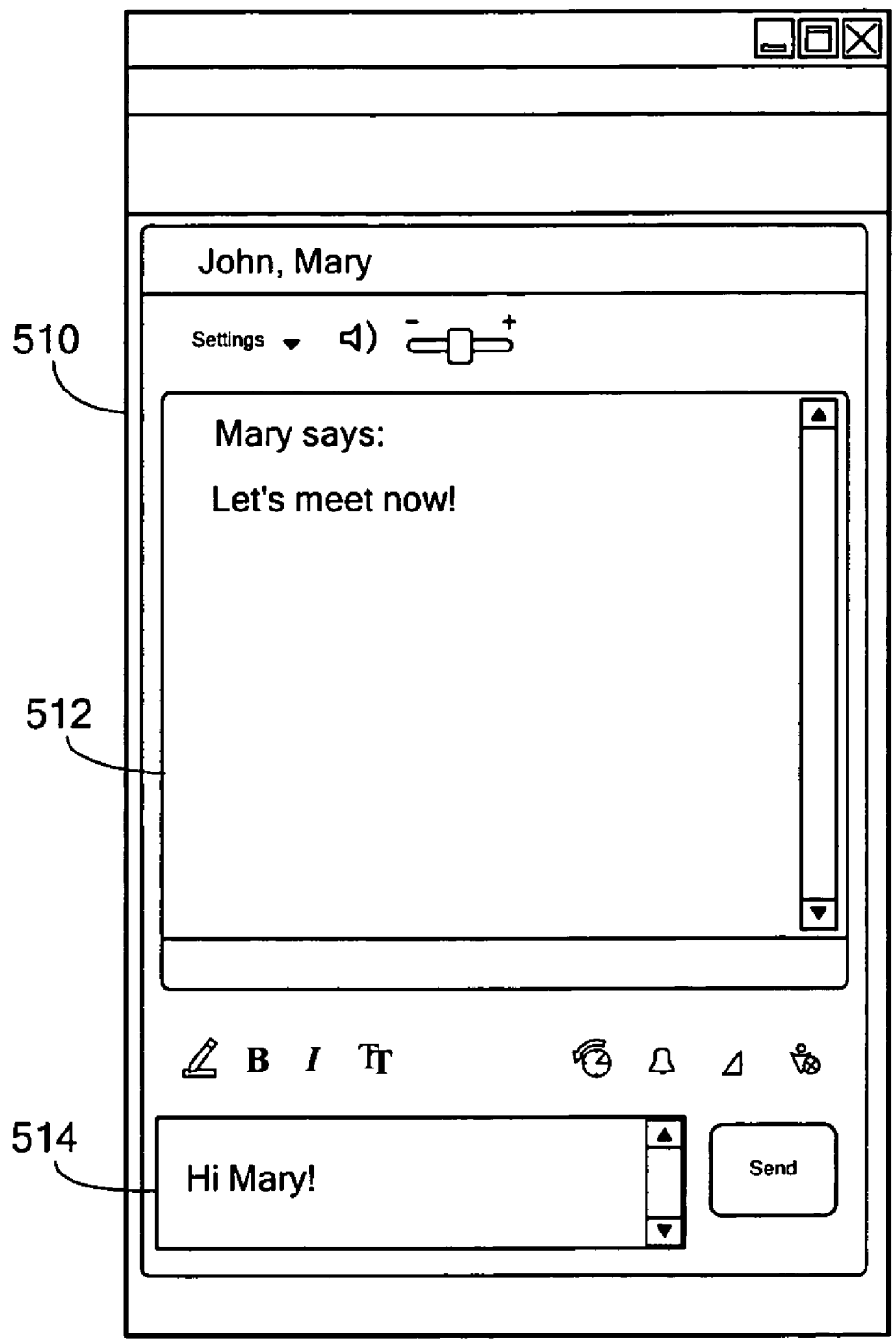
Figure 5H:
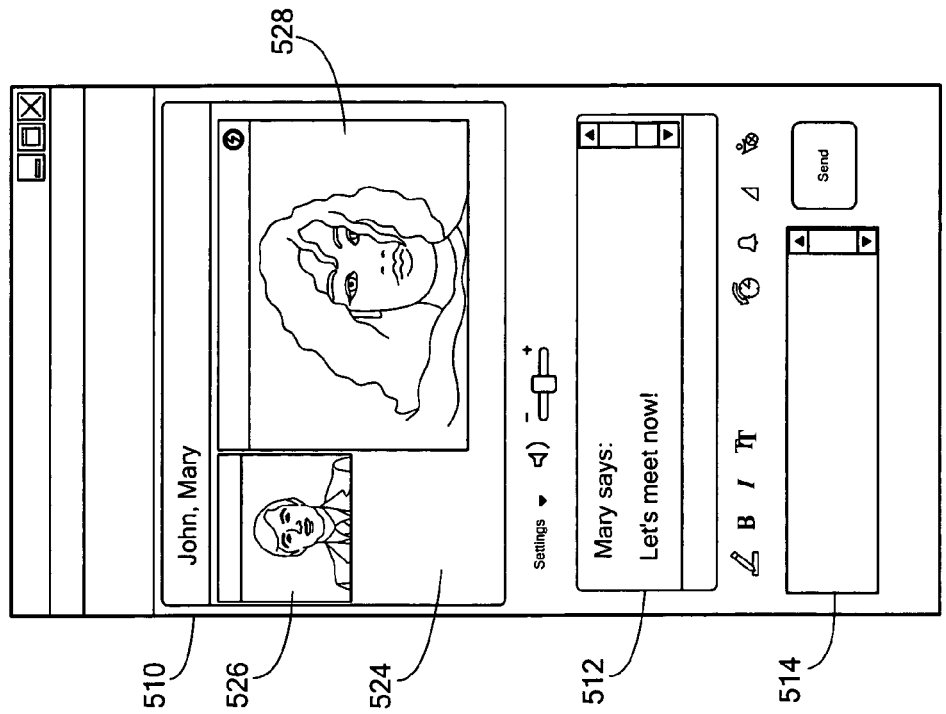

In the event Mary clicks on the request meeting button (see FIG. 5b), the real-time messaging system verifies that John's client system is on-line, generates a unique identifier for the on-line meeting, and attempts to make contact with John's client system, as indicated in FIG. 5c. As further shown in FIG. 5c, the display screen of Mary's client system provides a "cancel" button, which Mary may click on to cause the system to cancel the initiation of the on-line meeting having the above-described meeting identifier.

In the event the real-time messaging system successfully contacts John's client system, a toast 506 (see FIG. 5d) pops up on John's display screen, including the message "On-line Meeting Request Mary: Let's meet now!" After John clicks on the toast 506, a dialog box 508 (see FIG. 5e) appears on the display screen of John's client system, indicating the caller's name (Mary), and the topic of the on-line meeting (Let's meet now!). In one embodiment, the indication of the topic of the on-line meeting is not restricted to text. For example, Mary may record a short audio or video clip, e.g., "John, I need to talk to you about the project right away," which would be played on John's client system when the toast 506 was displayed. The dialog box 508 includes an "accept" button and a "reject" button, which John may selectively click on to accept or reject Mary's invitation to join the on-line meeting. The dialog box 508 also includes a message, "NOTE: Cannot authenticate the identity of the requester", because Mary indicated that she was a guest user and not a subscriber, which would be subject to system authentication (see also FIG. 5b). In one embodiment, in the event a subscriber ("Joan") invited John to join an on-line meeting and Joan was successfully authenticated by the system, the dialog box 508 may include a message indicating the mechanism used to authenticate Joan, e.g., "Call from Joan (identity certified by Windows™ NTLM authentication)". It is understood that any other suitable mechanism for authenticating or otherwise verifying the identity of Joan may be employed. In addition, the authentication or verification mechanism may be selectable by Joan.

Figure 5G:
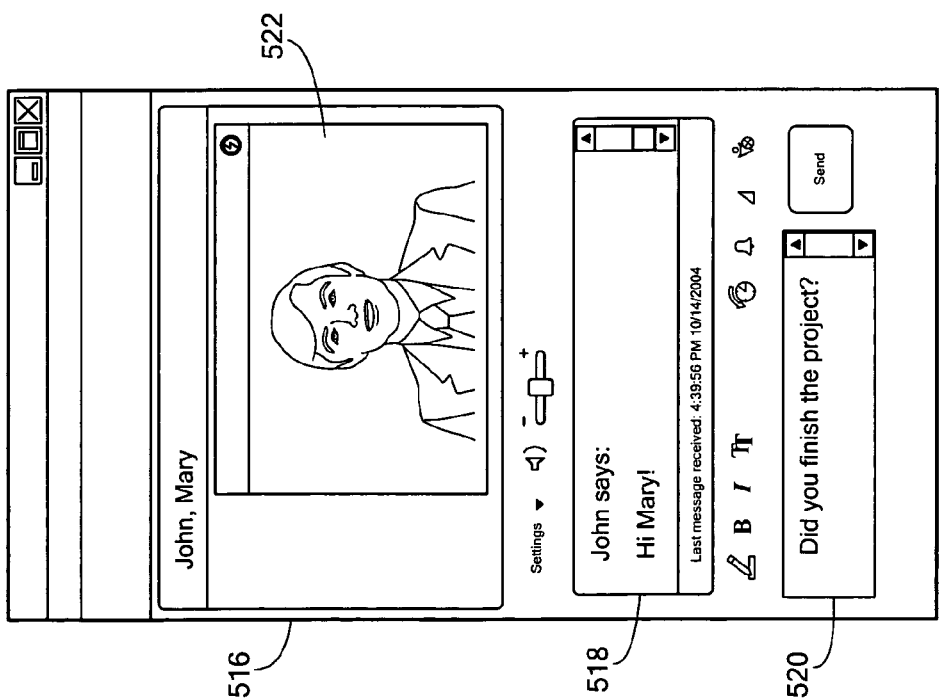

In the event John clicks on the accept button included in the dialog box 508, a first meeting window 510 (see FIG. 5f) opens on the display screen of John's client system, including a first region 512 operative to display text messages from Mary ("Let's meet now!"), and a second region 514 operative to allow John to enter and send text messages to Mary ("Hi Mary"). Next, a second meeting window 516 (see FIG. 5g) opens on the display screen of Mary's client system, including a first region 518 operative to display the text massages from John ("Hi Mary"), and a second region 520 operative to allow Mary to enter and send the text messages to John ("Did you finish the project?"). In one embodiment, the meeting window 510 and/or the meeting window 516 include a third region 522 (see FIG. 5g) configured to display video images of Mary and/or John. As shown in FIG. 5g, the meeting window 516 on Mary's display screen includes the region 522 containing a video image of John. In an alternative embodiment, the meeting window 510 may include a fourth region 524 (see FIG. 5h) configured to display a video image 526 of John and a video image 528 of Mary.

Having described the above illustrative embodiments, other alternative embodiments or variations may be made. For example, a number of billing models may be employed in conjunction with the presently disclosed real-time messaging system. Within each billing model, each system user may take on the role of a meeting initiator (i.e., the entity initially requesting the meeting), a meeting sponsor (i.e., the entity paying for the meeting), a meeting owner (i.e., the entity accepting the request for a meeting), a meeting invitee (i.e., the entity or entities who are invited to the meeting), and a meeting participant (i.e., the entity or entities who take part in the meeting). The meeting initiator, a third party, a designated invitee, or any other suitable meeting invitee or participant may be ultimately responsible for paying for the on-line meeting or teleconference.

Figure 6:
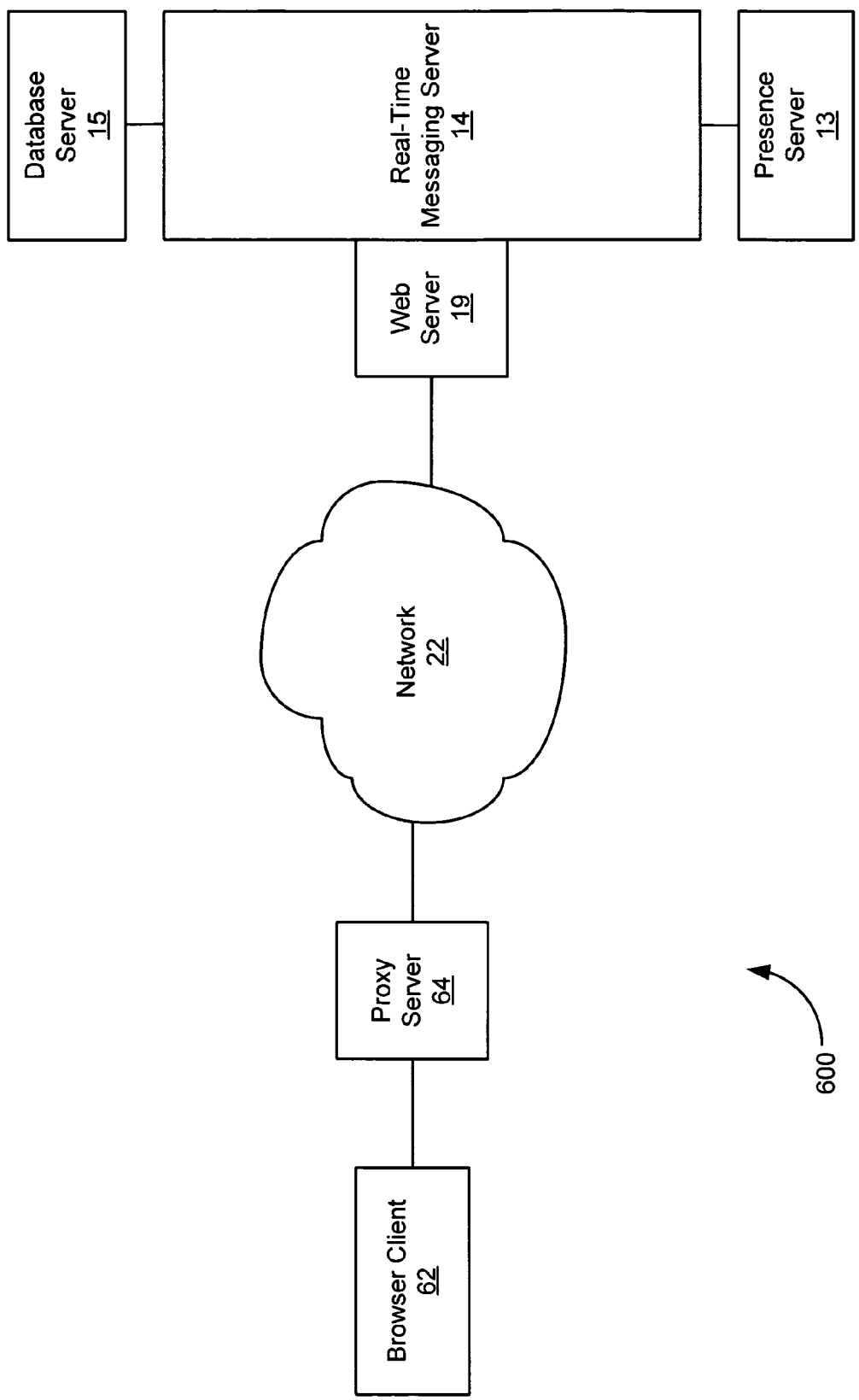
FIG. 6 is a block diagram illustrating an alternative embodiment of the real-time messaging system of FIG. 1, in which a web browser provides the functions of a real-time messaging client system by connecting to the real-time messaging server via the communications network and a proxy server.

In addition, it was described that a third party browser client or web services application running on a client computer within the real-time messaging system may be employed to initiate an on-line meeting or teleconference. It should be noted, however, that the browser or web services client might not maintain information about the state of conditions stored within the system. In one embodiment, a client system may retrieve such state information from a real-time messaging server via a web server. In another embodiment, a real-time messaging system 600 (see FIG. 6) may be provided, in which a client system 62 employs a browser (e.g., HTML) application to access the web server 19 via a middle or proxy server 64. For example, the state of the meeting manager and/or the presence cache included in the gateway server 134 (see FIG. 3) may be tied to the browser application by maintaining the state on the middle or proxy server 64. In each of these embodiments, it is generally more efficient to store the state information in the random access memory (RAM) of the real-time messaging server hosting the corresponding on-line meeting or teleconference. In still another embodiment, a real-time messaging system may include a plurality of real-time messaging servers, as may be required to support multiple concurrent on-line meetings or teleconferences. Such a system may be efficiently scaled using an intelligent load-balancer, thereby assuring that each step required to initiate a particular meeting is assigned to the same real-time messaging server.

In addition, it was described that an e-mail message such as the e-mail message 502 (see FIG. 5a) includes an icon 503 displaying the phrase "I'm Available" to indicate the on-line presence of a corresponding client system, and a message 505 "Click to meet with me now!", both of which may be hyperlinked via a URL to a web page configured to initiate the on-line meeting. In an alternative embodiment, the hyperlink included in the e-mail message 502 may be customized to the recipient of the e-mail. For example, with respect to the e-mail message 502 sent by John to Mary, the hyperlink in the e-mail message may contain Mary's contact information and/or any other useful information, e.g., Mary's display name, e-mail address, and/or the subject of the on-line meeting encoded into the URL. In this alternative embodiment, because the URL is encoded with Mary's contact information, Mary would not have to enter her information into the contact form 504 (see FIG. 5b). In another embodiment, the contact information may be stored in a storage medium such as a database, and the URL may contain some code referring to the stored information. When the caller clicks on the hyperlink, the information need not be displayed to the caller, but can be displayed to the recipient, or may be used to trigger an automated function. For example, clicking on the hyperlink may cause a "screen pop" of the caller's information to be displayed on the recipient's client system, and/or may cause an invitation to join an on-line meeting to be routed to the most appropriate recipient(s). In still another embodiment, if the caller clicks on the hyperlink at a time when the recipient is unavailable, the process of initiating an on-line meeting with the recipient will begin at a later time when that recipient becomes available. For example, after clicking on the hyperlink, the caller may enter the required information into a contact form (e.g., the contact form 504, see FIG. 5b), and at a later time (perhaps several hours later), the caller may receive a toast on his or her client system indicating that the recipient is now available to join the on-line meeting. The on-line meeting may therefore be initiated whether the recipient is available or unavailable. The system may also be operative to generate a unique identifier for the desired on-line meeting before the recipient becomes available, and to employ the unique identifier to cancel the on-line meeting in the event the caller indicates that he or she no longer wishes to meet on-line with the recipient.

In yet another embodiment, the information to be entered into the contact form may be determined by the URL itself. For example, a unique URL may be provided to each caller. Further, the URL may contain information relating to where the link is being hosted (e.g., an e-mail message, a weblog or blog, a web page, etc.) and any other suitable information, and that information may be displayed with the on-line meeting invitation information on a toast (e.g., the toast 506, see FIG. 5d) or a meeting request window (e.g., the meeting request window 508, see FIG. 5e). In addition, information may be automatically entered into the contact form, which may or may not be visible to the caller. Such information may be automatically entered by a mechanism employing browser cookies, browser plug-ins (e.g., activex) that obtain the information from the caller's client system or login credentials, or any other suitable mechanism.

It will be appreciated by those of ordinary skill in the art that further modifications to and variations of the above-described system and method of initiating an on-line meeting or teleconference via a web page link or a third party application may be made without departing from the inventive concepts disclosed herein. Accordingly, the invention should not be viewed as limited except as by the scope and spirit of the appended claims.

What is claimed is:

1. A method of performing real-time communications, comprising:
    displaying, by a first computer, a first web page accessed via a network, the first web page comprising a hyperlink, the hyperlink associated with a lifeline, the lifeline comprising a plurality of user computers and one or more ordering attributes, wherein the lifeline is configured to specify one or more stand-in users, the hyperlink having a uniform resource locator (URL); and
    in response to selection, at the first computer, of the hyperlink displayed on the first web page, initiating a two-way real-time communications session between the first computer and an available second computer,
    wherein the initiating the two-way real-time communications session includes determining an on-line presence of the second computer, and determining an availability of the available second computer for participating in the two-way real-time communications session.

2. The method of claim 1, wherein the initiating the two-way real-time communications session further includes accessing a second web page over the network by the first computer, the second web page pointed to by the URL associated with the hyperlink.

3. The method of claim 2, wherein the second web page is configured to allow a user of the first computer to enter information relating to an identity, wherein the user is a guest user, and wherein the information comprises an e-mail address.

4. The method of claim 3, wherein the initiating the two-way real-time communications session further includes determining a verifiability of the identity of the user of the first computer.

5. The method of claim 4, further comprising determining that the user of the first computer is either a guest user or a subscriber, wherein the determining the verifiability of the identity of the user comprises determining that the identity of the user is verifiable in response to the user of the first computer being a subscriber.

6. The method of claim 2, wherein the initiating the two-way real-time communications session further includes accessing the second web page over the network by the first computer, the second web page configured to accept information relating to a topic of the two-way real-time communications session.

7. The method of claim 6, wherein the initiating the two-way real-time communications session further includes accessing the second web page over the network by the first computer, the second web page further configured to allow a user of the first computer to enter information relating to the topic of the two-way real-time communications session, and wherein the entered information comprises at least one of an audio clip, a video clip, or an image.

8. The method of claim 2, further comprising selecting a button disposed on the second web page to request the two-way real-time communications session with the available second computer.

9. The method of claim 8, further comprising in response to the selecting of the button on the second web page, displaying a toast on the available second computer, and announcing the requested two-way real-time communications session between the first computer and the available second computers.

10. The method of claim 9, further comprising selecting the toast displayed on the available second computer.

11. The method of claim 10, further comprising in response to the selecting of the toast on the available second computer, displaying; a dialog box on the available second computer, wherein the dialog box is configured to display information relating to at least one of an identity of a user of the first computer or a topic of the real-time communications session.

12. The method of claim 11, further comprising selecting a button disposed on the dialog box displayed on the available second computer to accept the requested two-way real-time communications session between the first computer and the available second computers.

13. The method of claim 12, wherein the dialog box displayed on the available second computer includes an indication of whether the identity of the user of the first computer has been verified.

14. The method of claim 13, wherein the dialog box displayed on the available second computer includes an indication of a mechanism used to verify the identity of the user of the first computer.

15. The method of claim 12, further comprising in response to the selecting of the button disposed on the dialog box displayed on the available second computer to accept the requested two-way real-time communications session between the first computer and the available second computers, displaying a first meeting window on the available second computer.

16. The method of claim 15, further comprising in response to the displaying of the first meeting window on the available second computer, displaying a second meeting window on the first computer.

17. The method of claim 15, further comprising displaying the second meeting window on the first computer, wherein the first and second meeting windows are configured to provide information content in an interactive graphics format.

18. The method of claim 17, wherein the information content includes visual information in the form of at least one of text and video images.

19. The method of claim 17, wherein the information content includes audible information.

20. The method of claim 10, wherein the toast comprises at least one of an audio clip, a video clip, or an image.

21. The method of claim 10, further comprising in response to the selecting of the toast on the second computer, displaying a dialog box on the available second computer, and selecting a button disposed on the dialog box to reject the requested two-way real-time communications session between the first computer and the available second computers.

22. The method of claim 21, further comprising in response to the selecting of the button disposed on the dialog box to reject the requested two-way real-time communications session between the first computer and the available second computers, displaying a message on the first computer indicating that the second computer is unavailable.

23. The method of claim 1, further comprising in response to the available second computer being determined to be unavailable, displaying a message on the first computer indicating that the available second computer is unavailable.

24. The method of claim 23, further comprising initiating the two-way real-time communications session between the first computer and the available second computers in response to the availability of the available second computer.

25. The method of claim 1, further comprising accessing the first web page over the network by the first computer, the first web page comprising the hyperlink, the hyperlink associated with the second computer, and wherein the hyperlink comprises an hyperlink area, the hyperlink area comprises at least one of an icon or an alphanumeric string displayable on the first web page.

26. The method of claim 25, further comprising indicating the availability of the available second computer for participating in the two-way real-time communications session via a characteristic of the at least one of the icon or the alphanumeric string displayable on the first web page, wherein the characteristic includes at least one user-defined representation corresponding to one or more of a word, a phrase, or an image.

27. The method of claim 1, further comprising providing information corresponding to the user of the first computer, wherein the hyperlink comprises the provided information.

28. The method of claim 1, further comprising in response to the available second computer being determined to be available, generating a unique identifier associated with the two-way real-time communications session.

29. The method of claim 28, further comprising in response to the two-way real-time communications session not being convened within a predetermined time period, canceling the two-way real-time communications session associated with the unique identifier.

30. The method of claim 1, further comprising determining a rate at which the hyperlink is selected, and, in response to the rate exceeding a predetermined threshold, canceling the initiation of the two-way real-time communications session.

31. The method of claim 30, in response to the rate exceeding a predetermined threshold, logging the hyperlink selections as a potential overload or attempted denial-of-service attack.

32. A system for performing real-time communications, the system comprising:
   a first user computer configured to access a first document, the first document comprising a hyperlink displayed thereon, the hyperlink associated with a lifeline, the lifeline comprising a plurality of user computers and one or more ordering attributes, wherein the lifeline is configured to specify one or more stand-in users, the hyperlink comprising a uniform resource locator (URL); and
   at least one real-time messaging server communicably coupled to the first user computer, the real-time messaging server configured to, in response to a selection at the first user computer; of the hyperlink, determine an on-line presence of at least one second user computer of the plurality of user computers, and determining an availability of the at least one second user computer for participating in a two-way real-time communications session with the first user computer, and, in response to the at least one second user computer being available, to initiate the two-way real-time communications session between the first user computer and the at least one second user computer.

33. The system of claim 32, wherein the first user computer comprises at least one of a PC client, a Flash client, a mobile client, a browser client, or a web services client.

34. The system of claim 33, further comprising a web server, wherein at least one of the browser client or the web services client are configured to communicate with the at least one real-time messaging server via the web server.

35. The system of claim 33, further comprising a media server, wherein at least one of the PC client, the Flash client, or the mobile client are configured to communicate with the real-time messaging server via the media server.

36. The system of claim 32, further comprising:
   a telephony server;
   a voice response unit; and
   conference bridge;
      wherein the voice response unit and the conference bridge are configured to communicate with the real-time messaging server via the telephony server.

37. The system of claim 32, further comprising a proxy server configured to store state information relating to the two-way real-time communications session between the first user computer and the at least one second user computer, the proxy server being communicably coupled between the first user computer and a communications network.

38. The system of claim 32, wherein the first document is at least one of a web page or an e-mail message.

39. The system of claim 32, wherein the real-time messaging server is configured to, in response to the second user computer being determined to be available, generate a unique identifier associated with the real-time communications session.

40. The system of claim 39, wherein the at least one real-time messaging server is further configured to, in response to the two-way real-time communications session not being convened within a predetermined time period, cancel the two-way real-time communications session associated with the unique identifier.

41. A method, comprising:
- accessing, by a first computer, a first hyperlink-supporting document via a network, the first hyperlink-supporting document comprising a hyperlink, the hyperlink associated with an available second computer;
- displaying the first hyperlink-supporting document at the first computer; and
- in response to a selection of the hyperlink at the first computer, initiating a two-way real-time communications session between the first computer and the available second computer, wherein the initiating the two-way real-time communications session comprises determining an availability of the available second computer to participate in the two-way real-time communications session, wherein the two-way real-time communication session utilizes application software utilizing a real-time messaging protocol (RTMP) for communication, and wherein the application software is downloaded to a browser program.

42. The method of claim 41, wherein the initiating the two-way real-time communications session further comprises accessing a second hyperlink-supporting document over the network, the second hyperlink-supporting document pointed to by a URL associated with the hyperlink.

43. The method of claim 41, wherein the hyperlink is associated with a lifeline, the lifeline comprising a plurality of users and one or more ordering attributes, wherein the lifeline is configured to specify one or more stand-in users.

44. The method of claim 41, wherein the determining the availability of the available second computer comprises:
- determining whether the available second computer is associated with a lifeline;
- in response to determining that the available second computer is associated with the lifeline,
- determining that the second computer is associated with a specified user associated with the lifeline; and
- determining an availability of the specified user.

\* \* \* \* \*

UNITED STATES PATENT AND TRADEMARK OFFICE
CERTIFICATE OF CORRECTION

PATENT NO. : 8,370,432 B2  
APPLICATION NO. : 11/293035  
DATED : February 5, 2013  
INVENTOR(S) : Digate et al.

Page 1 of 1

It is certified that error appears in the above-identified patent and that said Letters Patent is hereby corrected as shown below:

In the Specification

In Column 6, Line 16, delete "N.Y.U.S.A.," and insert -- N.Y., U.S.A., --, therefor.

In Column 13, Line 67, delete "massages" and insert -- messages --, therefor.

In the Claims

In Column 16, Lines 49-50, in Claim 9, delete "computers." and insert -- computer. --, therefor.

In Column 16, Line 63, in Claim 12, delete "computers." and insert -- computer. --, therefor.

In Column 17, Lines 9-10, in Claim 15, delete "computers," and insert -- computer, --, therefor.

In Column 17, Line 33, in Claim 21, delete "computers." and insert -- computer. --, therefor.

In Column 17, Line 38, in Claim 22, delete "computers," and insert -- computer, --, therefor.

In Column 17, Line 46, in Claim 24, delete "computers" and insert -- computer --, therefor.

In Column 18, Line 18, in Claim 32, delete "the system".

In Column 18, Lines 20-21, in Claim 32, delete "hyperlink displayed thereon," and insert -- hyperlink, --, therefor.

In Column 18, Line 29, in Claim 32, delete "computer;" and insert -- computer --, therefor.

Signed and Sealed this  
Tenth Day of June, 2014

Michelle K. Lee  
*Deputy Director of the United States Patent and Trademark Office*